(12) United States Patent
Iqbal

(10) Patent No.: US 6,625,677 B1
(45) Date of Patent: Sep. 23, 2003

(54) METHOD FOR TRANSFERRING DATA, AND A COMPUTER SYSTEM

(75) Inventor: Asif Iqbal, Los Altos, CA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/315,575

(22) Filed: May 20, 1999

Related U.S. Application Data

(60) Provisional application No. 60/086,289, filed on May 21, 1998.

(51) Int. Cl.⁷ .......................... G06F 13/00; G06F 13/38
(52) U.S. Cl. ....................................... 710/100; 361/748
(58) Field of Search ................................ 710/100, 105, 710/300, 305, 301, 315; 709/253, 232, 250, 252; 370/400, 423, 420, 408; 326/30, 21, 63; 340/825; 307/115; 361/683, 748, 764

(56) References Cited

U.S. PATENT DOCUMENTS

| | | | |
|---|---|---|---|
| 4,903,015 A | * | 2/1990 | Van Steenbrugge et al. |
| 5,613,070 A | * | 3/1997 | Born |
| 6,061,754 A | * | 5/2000 | Cepulis et al. |
| 6,067,594 A | * | 5/2000 | Perino et al. |
| 6,205,147 B1 | * | 3/2001 | Mayo et al. |
| 6,356,106 B1 | * | 3/2002 | Greeff et al. |

\* cited by examiner

Primary Examiner—Gopal C. Ray
(74) Attorney, Agent, or Firm—Ansel M. Schwartz

(57) ABSTRACT

A computer system. The system includes a plurality of devices. The system includes a printed circuit board having a radial bus topology which connects to each of the plurality of devices and through which each of the plurality of devices communicate with each other. A computer system including N devices, where N is greater than or equal to 11 and is an integer. The system includes a printed circuit board having a radial bus topology which connects to each of the devices and through which each of the devices communicate with each other. The topology is operable at a frequency of at least 75 MHZ. A method for transferring data. A radial bus topology on a printed circuit board in a computer. The radial bus topology includes equidistant line segments wherein the line segments emanate from a central location.

17 Claims, 2 Drawing Sheets

SENDING DATA FROM A FIRST DEVICE TO A BUS HAVING A RADIAL TOPOLOGY

RECEIVING DATA FROM THE BUS AT A SECOND DEVICE

SENDING DATA FROM A THIRD DEVICE TO THE BUS

RECEIVING DATA FROM THE BUS AT A FOURTH DEVICE

*FIG. 2*

METHOD FOR TRANSFERRING DATA, AND A COMPUTER SYSTEM

This application claims the benefit of U.S. Provisional Application No. 60/086,289 filing date May 21, 1998.

FIELD OF THE INVENTION

The present invention is related to multipoint bus topologies. More specifically, the present invention is related to multipoint bus topologies which is radial for multipoint that works at 75 MHZ and is scalable to higher frequencies of up to 150 MHZ.

BACKGROUND OF THE INVENTION

The Ultra Workstations from Sun Microsystems use a bus in their motherboard which works at 100 MHZ but is limited to 5 device loads. It uses conventional daisy chain or cluster topology. This design will not scale to drive 11 devices at 75 MHZ.

The PCI bus design uses a speedway topology, is specified at 66 MHZ and has significantly fewer than 11 devices on the bus. It is not scalable to 75 MHZ and 11 devices.

A Multipoint bus topology that works at 75 MHZ and is scalable to higher frequencies of up to 150 MHZ is needed in this art. The bus design of the present invention can scale to drive multiple loads, such as 11 or more devices on the bus. The device loads are symmetric in a way that any device can drive the data to any other device. No termination resistors are needed on the board.

The present invention provides a radial topology for multipoint, high speed bus without termination resistors. The purpose of the invention is to provide a high data rate bus with multiple loads for reliable data transfer, such as 11 or more devices at 75 MHZ or higher.

The present invention provides many advantages, including: (1) topology works at 75 MHZ clock speed with 11 devices connected to the bus; (2) any device can transfer data to any of the other 10 devices; (3) no termination resistors are needed on the board; and (4) The topology is scalable to much higher clock speed.

SUMMARY OF THE INVENTION

The present invention pertains to a computer system. The system comprises a plurality of devices. The system comprises a computer having a printed circuit board having a radial bus topology which connects to each of the plurality of devices and through which each of the plurality of devices communicate with each other.

The present invention pertains to a computer system. The system comprises N devices, where N is greater than or equal to 11 and is an integer. The system comprises a printed circuit board having a radial bus topology which connects to each of the devices and through which each of the devices communicate with each other. The topology is operable at a frequency of at least 75 MHZ.

The present invention pertains to a method for transferring data. The method comprises the steps of sending data from a first device to a bus having a radial topology to which the first device is connected. Then there is the step of receiving data sent by the first device at a second device from the bus to which the second device is connected. Next there is the step of sending data from a third device to the bus to which the third device is connected. Then there is the step of receiving data sent by the third device at a fourth device from the bus to which the fourth device is connected.

The present invention pertains to a radial bus topology on a printed circuit board in a computer. The radial bus topology comprises equidistant line segments wherein the line segments emanate from a central location.

The present invention pertains to a computer system. The system comprises a first device. The system comprises a printed circuit board having a radial net origin, a first line segment extending from the radial net origin which connects with the first device, a second line segment extending from the radial net origin, and at least a third line segment extending from the radial net origin. The system comprises a second device which connects to the second line segment. The system comprises at least a third device which connects to the third line segment. The first device and second device connect with each other through the first line segment, radial net origin and second line segment. The first device communicates with the third device through the first line segment, radial net origin and third line segment. The second device communicates with the third device through the second line segment, radial net origin and the third line segment.

BRIEF DESCRIPTION OF THE DRAWINGS

In the accompanying drawings, the preferred embodiment of the invention and preferred methods of practicing the invention are illustrated in which:

FIG. 2 is a flow chart of a method of the present invention.

DETAILED DESCRIPTION

Figure 1:
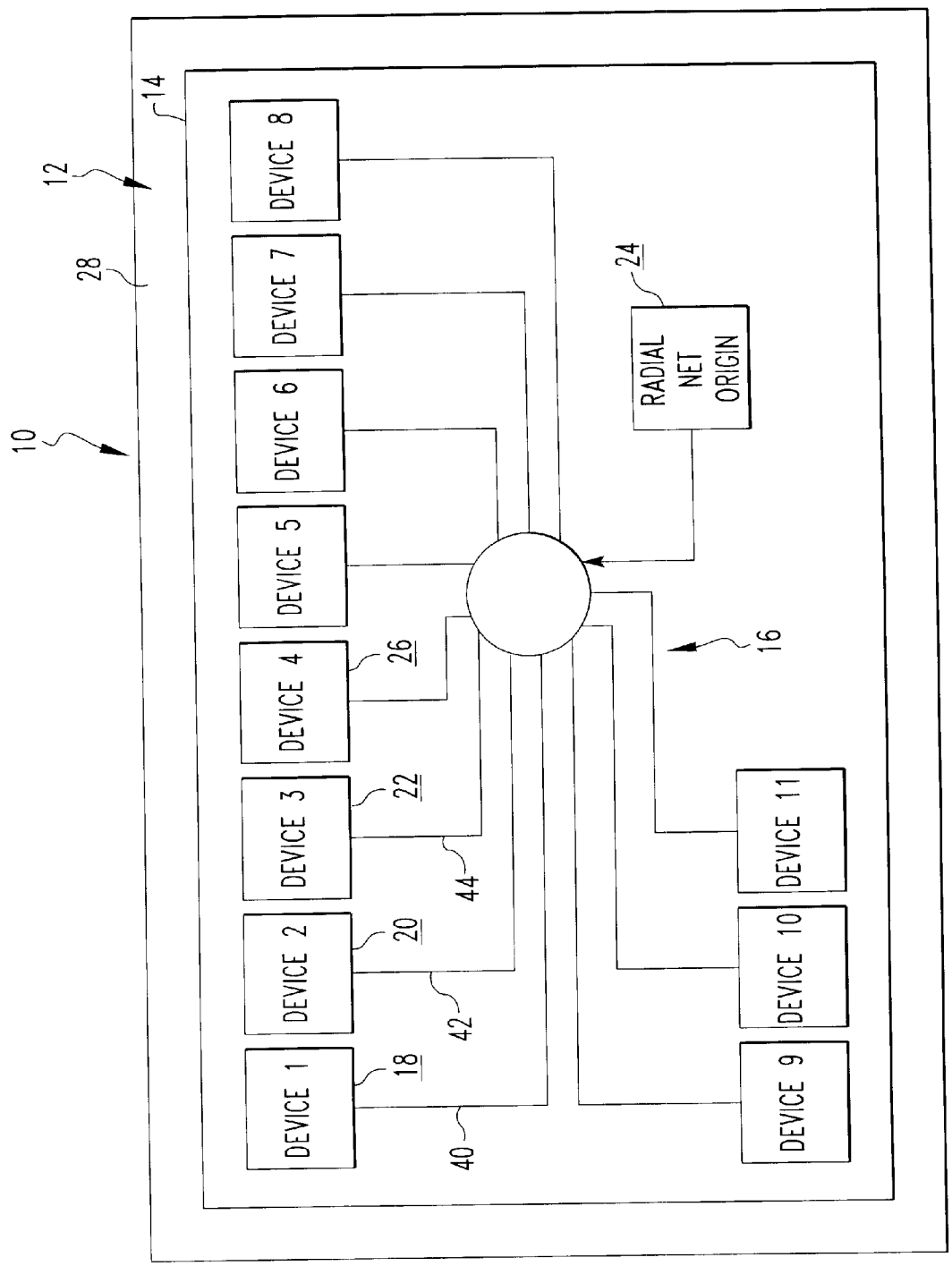
FIG. 1 is a schematic representation of a computer system of the present invention.

Referring now to the drawings wherein like reference numerals refer to similar or identical parts throughout the several views, and more specifically to FIG. 2 thereof, there is shown a computer system 10. The system 10 comprises a computer 28 having a plurality of devices 12. The system 10 comprises a printed circuit board 14 having a radial bus 16 topology which connects to each of the plurality of devices 12 and through which each of the plurality of devices 12 communicate with each other.

Preferably, each device of the plurality of devices 12 can drive data to any other device of the plurality of devices 12. The board 14 preferably has no termination resistors. Preferably, the bus 16 is operable at a frequency, and is scalable to higher frequencies than the frequency. The bus 16 preferably operates at 75 MHZ. Preferably, the bus 16 is scalable to 150 MHZ.

There is preferably a first device 18, a second device 20 and at least a third device 22 of the plurality of devices 12. Preferably, there are at least 11 devices 12.

The bus 16 preferably has a monotonic change of bus 16 logic states to ensure reliable data transfer between devices 12. Preferably, the bus 16 has switching from high to low and low to high states without data corruption.

The present invention pertains to a computer system 10. The system 10 comprises N devices 12, where N is greater than or equal to 11 and is an integer. The system 10 comprises a printed circuit board 14 having a radial bus 16 topology which connects to each of the devices 12 and through which each of the devices 12 communicate with each other. The topology is operable at a frequency of at least 75 MHZ.

The present invention pertains to a method for transferring data, as shown in FIG. 2. The method comprises the steps of sending data from a first device 18 to a bus 16 having a radial topology to which the first device 18 is connected. Then there is the step of receiving data sent by the first device 18 at a second device 20 from the bus 16 to which the second device 20 is connected. Next there is the step of sending data from a third device 22 to the bus 16 to which the third device 22 is connected. Then there is the step of receiving data sent by the third device 22 at a fourth device 26 from the bus 16 to which the fourth device 26 is connected.

Preferably, the step of receiving data sent by the first device 18 includes the step of receiving data sent by the first device 18 at the second device 20 from the bus 16 after the data sent by the first device 18 travels through a radial net origin 24 of the bus 16. The radial net origin 24 directly connects with each device. The step of receiving data sent by the third device 22 preferably includes the step of receiving data sent by the third device 22 at the fourth device 26 from the bus 16 after the data sent by the third device 22 travels through the radial net origin 24.

The present invention pertains to a radial bus 16 topology on a printed circuit board 14 in a computer. The radial bus 16 topology comprises line segments wherein the line segments emanate from a central location. Preferably, the line segments are equidistant. However, they do not have to be physically equivalent in length, just equivalent to length, as explained below.

The present invention pertains to a computer system 10, as shown in FIG. 1. The system 10 comprises a first device 18. The system 10 comprises a printed circuit board 14 having a radial net origin 24, a first line segment 40 extending from the radial net origin 24 which connects with the first device 18, a second line segment 42 extending from the radial net origin 24, and at least a third line segment 44 extending from the radial net origin 24. The system 10 comprises a second device 20 which connects to the second line segment 42. The system 10 comprises at least a third device 22 which connects to the third line segment 44. The first device 18 and second device 20 connect with each other through the first line segment 40, radial net origin 24 and second line segment 42. The first device 18 communicates with the third device 22 through the first line segment 40, radial net origin 24 and third line segment 44. The second device 20 communicates with the third device 22 through the second line segment 42, radial net origin 24 and the third line segment 44. Preferably, the line segments are equidistant from the radial net origin 24.

In the operation of the invention, a bus 16 topology affords a heavily loaded, multipoint bus 16 to operate at high (75 MHZ) frequency without the use of board 14 termination resistors. The current bus 16 designs are limited in speed owing to the long bus 16 settling time induced by reflection noise. In light of the long bus 16 settling time penalty, the high performance bus 16 designs are constrained in terms of clock speed and how many device loads they can drive. The key idea is to devise a bus 16 topology, a transmission line impedance and coupling of the topology and line impedance with the driver circuit in such a way as to create a monotonic change of bus 16 logic states to ensure reliable data transfer. By varying the aforementioned elements, the physical length of each segment can vary, but each segment can be equivalent to every other line segment which extends from the radial net origin 24. Further, it is scalable to higher clock speeds and larger device loads.

The radial topology ensures reliable bus 16 switching from high to low and low to high states without data corruption at 75 MHZ clock speed for 11 devices 12 connected to the bus 16. The system 10 enables any device in the bus 16 to control the bus 16 and drive data to any of the remaining 10 devices 12. The bus 16 is based on multireflection switching principle in such a way that the change of state occurs in a monotonic and gradual way without corrupting the data. The topology does not require any termination resistors on the board 14 affording ease of implementation and cost reduction.

The inexorable pace of technology improvements and demand for pervasive bandwidth in the Local Area Networking (LAN) industry is resulting in ever increasing performance in hardware design. As the port density and the incoming data rate to the LAN switch increases, a corresponding gain in switching fabric capacity is required to scale the overall system 10 performance. The buses 16 that make up the switching fabric capacity have to deliver a very high throughput to meet the performance requirements. The increase in switching fabric bandwidth requires higher clock speed and more loads on the bus 16. Both of these factors are taxing the limits of existing bus 16 design principles. In order to operate the bus 16 at high speed, both the driver circuits as well as the transmission line topology on the board 14 has to be designed so that the bus 16 can switch states within the clock cycle time. The driver circuit has to be specified for sufficient strength and the transmission line impedance and topology has to be such as to afford the bus 16 to operate within the cycle time.

One example of the topology is given in FIG. 1. The bus 16 topology plays an important role in determining the bus 16 timing owing to the settling time penalty caused by reflection noise. The reflections in the bus 16 are created by multiple loads acting as discontinuities and causing ringing in the waveforms. The ringing limits how quickly the bus 16 can switch its logic states and, thus, determines its overall speed. The radial topology limits the reflection noise and provides reliable means for the bus 16 to operate up to 75 MHZ under the constraints of 11 device loads that are distributed on the board 14. Most of the existing bus 16 designs are limited in the number of device loads that they can handle and they require external board 14 termination schemes. The radial topology in combination with careful specification of driver strength and the board 14 transmission line impedance forms the essence of the present invention. Further, the radial topology does require the use of termination scheme on the board 14 to achieve the bus 16 timing. The principle behind the design is to control the reflections so that a monotonic change of state from Logic High level to Logic Low Level and vice versa is ensured. The system 10 is scalable to higher clock speed and larger device loads.

Note that there are no termination resistors needed on the board 14 for this bus 16 topology which eases the implementation of this topology on board 14 and results in component and cost reduction.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:
1. A computer system comprising:
   a computer having:
      a plurality of devices; and
      a printed circuit board having a radial bus topology which connects to each of the plurality of devices and through which each of the plurality of devices communicate with each other.

2. A system as described in claim 1 wherein each device of the plurality of devices can drive data to any other device of the plurality of devices.

3. A system as described in claim 2 wherein the board has no termination resistors.

4. A system as described in claim 3 wherein the bus is operable at a frequency, and is scalable to higher frequencies than the frequency.

5. A system as described in claim 4 wherein the bus operates at 75 MHZ.

6. A system as described in claim 5 wherein the bus is scalable to 150 MHZ.

7. A system as described in claim 6 wherein there is a first device, a second device and at least a third device of the plurality of devices.

8. A system as described in claim 7 wherein there are at least 11 devices.

9. A system as described in claim 8 wherein the bus has a monotonic change of bus logic states to ensure reliable data transfer between devices.

10. A system as described in claim 9 wherein the bus has switching from high to low and low to high states without data corruption.

11. A computer system comprising:

N devices, where N is greater than or equal to 11 and is an integer; and a printed circuit board having a radial bus topology which connects to each of the devices and through which each of the devices communicate with each other, said topology operable at a frequency of at least 75 MHZ.

12. A method for transferring data comprising the steps of:

sending data from a first device to a bus having a radial topology to which the first device is connected;

receiving data sent by the first device at a second device from the bus to which the second device is connected;

sending data from a third device to the bus to which the third device is connected; and receiving data sent by the third device at a fourth device from the bus to which the fourth device is connected.

13. A method as described in claim 12 wherein the step of receiving data sent by the first device includes the step of receiving data sent by the first device at the second device from the bus after the data sent by the first device travels through a radial net origin of the bus, said radial net origin directly connecting with each device.

14. A method as described in claim 13 wherein the step of receiving data sent by the third device includes the step of receiving data sent by the third device at the fourth device from the bus after the data sent by the third device travels through the radial net origin.

15. A radial bus topology on a printed circuit board in a computer comprising equidistant line segments wherein said line segments emanate from a central location.

16. A computer system comprising:

a first device;

a printed circuit board having a radial net origin, a first line segment extending from the radial net origin which connects with the first device, the second line segment extending from the radial net origin, and at least the third line segment extending from the radial net origin;

a second device which connects to the second line segment; and at least a third device which connects to the third line segment, said first device and second device connecting with each other through the first line segment, radial net origin and second line segment; said first device communicating with the third device through the first line segment, radial net origin and third line segment; said second device communicating with the third device through the second line segment, radial net origin and the third line segment.

17. A computer system as described in claim 16 wherein the line segments are equidistant from the radial net origin.

* * * * *